(12) United States Patent
Foresti et al.

(10) Patent No.: US 10,556,428 B2
(45) Date of Patent: *Feb. 11, 2020

(54) ACOUSTOPHORETIC PRINTING APPARATUS AND METHOD

(71) Applicant: President and Fellows of Harvard College, Cambridge, MA (US)

(72) Inventors: Daniele Foresti, Somerville, MA (US); Dimos Poulikakos, Zollikon (CH); Manish Kumar Tiwari, Harrow (GB)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,983

(22) Filed: Feb. 5, 2019

(65) Prior Publication Data

US 2019/0240976 A1 Aug. 8, 2019

Related U.S. Application Data

(63) Continuation of application No. 15/842,366, filed on Dec. 14, 2017, now Pat. No. 10,214,013, which is a (Continued)

(30) Foreign Application Priority Data

Jan. 24, 2014 (EP) .................................. 14000258

(51) Int. Cl.
*B33Y 10/00* (2015.01)
*B41J 2/14* (2006.01)
(Continued)

(52) U.S. Cl.
CPC ......... *B41J 2/14008* (2013.01); *B29C 64/112* (2017.08); *B33Y 10/00* (2014.12); *B33Y 30/00* (2014.12)

(58) Field of Classification Search
CPC ....... B33Y 10/00; B33Y 30/00; B29C 64/112; B41J 2/14008
See application file for complete search history.

(56) References Cited

U.S. PATENT DOCUMENTS 5,880,759 A 3/1999 Silverbrook
6,003,388 A 12/1999 Oeftering
(Continued)

OTHER PUBLICATIONS

International Search Report and Written Opinion for International PCT No. PCT/EP2015/051394, dated Apr. 9, 2015, pp. 1-11.
(Continued)

*Primary Examiner* — Lamson D Nguyen
(74) *Attorney, Agent, or Firm* — Brinks Gilson & Lione

(57) ABSTRACT

The present invention contains a printing apparatus and a method, e.g., for ejecting inks (i.e., pure liquids, mixtures, colloids, etc.) for a very broad range of physical properties (such as viscosity). Acoustic forces 3a may be generated by an emitter 1 and a reflector 2 to detach droplets 10 from a nozzle 6. The ink may be advanced through the nozzle 6 by a standard back pressure system 5. A reflectorless chamber 7 may enhance acoustic forces 8a and the droplets 10 may be ejected at a bottom 9 of said chamber 7, so that droplets 10 may be deposited on any substrate 11.

20 Claims, 10 Drawing Sheets

Figure 1:
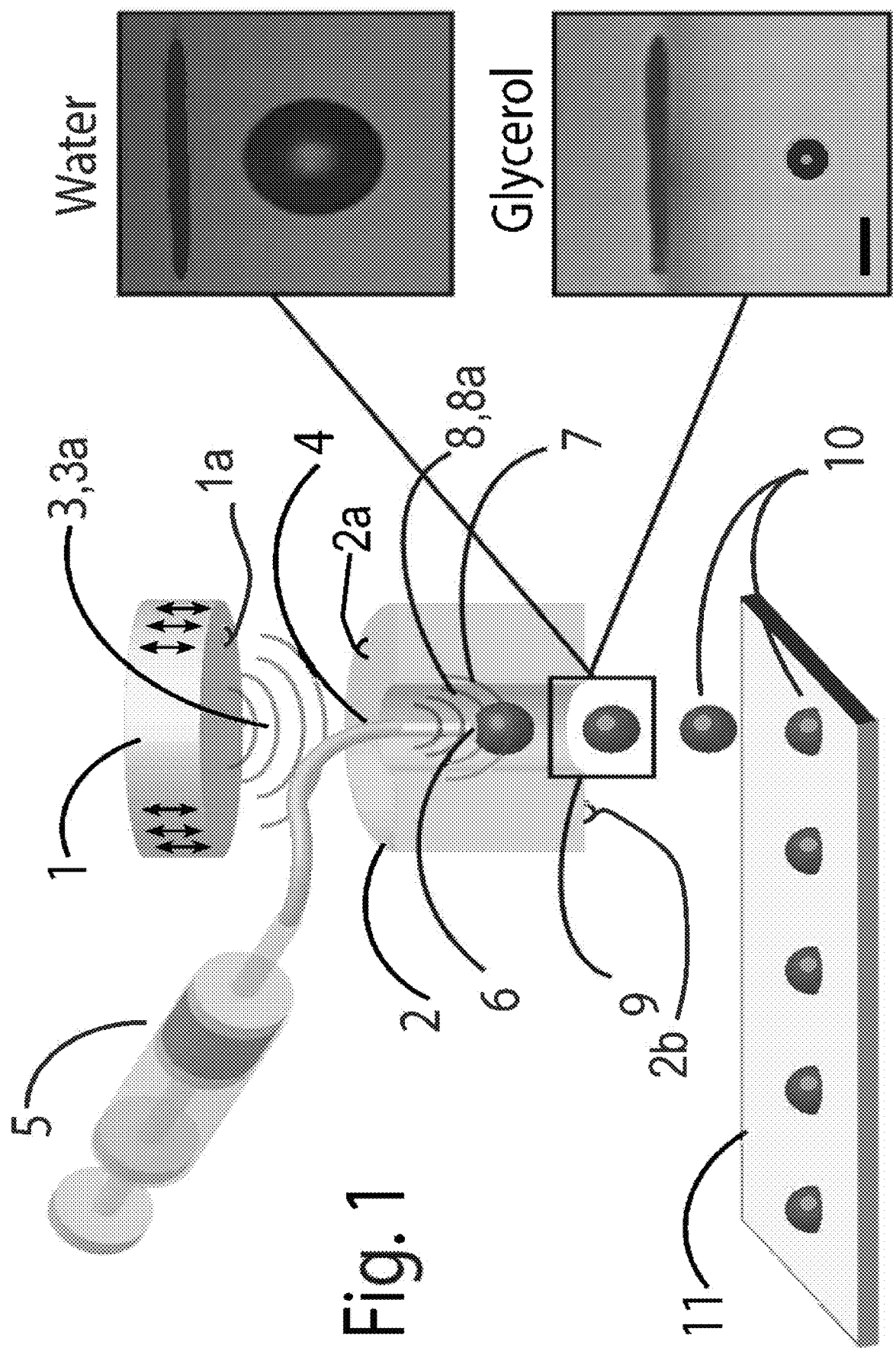

Related U.S. Application Data continuation of application No. 15/113,684, filed as application No. PCT/EP2015/051394 on Jan. 23, 2015, now Pat. No. 9,878,536.

(51) Int. Cl.
  *B33Y 30/00*   (2015.01)
  *B29C 64/112*  (2017.01)

(56) References Cited

U.S. PATENT DOCUMENTS

| | | | |
|---|---|---|---|
| 7,354,141 | B2 | 4/2008 | Ellson et al. |
| 9,878,536 | B2 | 1/2018 | Foresti et al. |
| 10,214,013 | B2 * | 2/2019 | Foresti ............... B41J 2/14008 |
| 2006/0144871 | A1 | 7/2006 | Van Tuyl et al. |
| 2009/0115820 | A1 | 5/2009 | Nomura et al. |

OTHER PUBLICATIONS

S. L. N. Ford, "Additive Manufacturing Technology: Potential Implications for U.S. Manufacturing Competitiveness," *Journal of International Commerce and Economics*, Sep. 2014, pp. 1-35.

J. Steele, "The Next Industrial Revolution: Functional Printing," *Printing News*, Apr. 1, 2014, pp. 1-5.

G. D. Martin and I. M. Hutchings, "Fundamentals of Ink Jet Technology," in *Inkjet Technology for Digital Fabrication, First Edition*, John Wiley & Sons (2013) pp. 21-44.

P.K. Kundu, I. M. Cohen and D. R. Dowling, "Conservation Laws," in *Fluid Mechanics*, Elsevier, Inc. (2012) pp. 95-169.

N. Bjelobrk et al., "Contactless transport of acoustically levitated particles," *Applied Physics Letters*, 97 (2010) pp. 161904-1-161904-3.

V. Vandaele et al., "Non-contact handling in microassembly: Acoustical levitation," *Precision Engineering*, 29 (2006) pp. 491-505.

E. H. Brandt, "Levitation in Physics," *Science*, 243 (1989) pp. 349-355.

H. Azhari, "Waves—A General Description," in *Basics of Biomedical Ultrasound for Engineers*, John Wiley & Sons, Inc. (2010) pp. 9-33.

L. V. King, "On the Acoustic Radiation of Pressure on Spheres," *Proceeding of the Royal Society of London*, 147 (1934) p. 212.

D. Foresti et al., "Contactless transport of matter in the first five resonance modes of a line-focused acoustic manipulator," *J. Acoust. Soc. Am.*, 131, 2 (2012) pp. 1029-1038.

J. Christensen et al., "Theory of Resonant Acoustic Transmission through Subwavelength Apertures," *Physical Review Letters*, 101 (2008) pp. 014301-1-014301-4.

B. Hou, "Tuning Fabry-Perot resonances via diffraction evanescent waves," *Physical Review B*, 76 (2007) pp. 054303-1-054303-054303-6.

J. Renner et al., "Reproducibility of DoD Inkjet Printing Systems," 38th International Research Conference, Advances in Printing and Media Technology, Budapest, 2011, pp. 1-8.

D. Foresti et al., "Investigation of a line-focused acoustic levitation for contactless transport of particles," *Journal of Applied Physics*, 109 (2011) pp. 0935503-1-0935503-11.

S. Zhao and J. Wallaschek, "A standing wave acoustic levitation system for large planar objects," *Arch. Appl. Mech*, vol. 81, 2011, pp. 123-139.

D. Foresti and D. Poulikakos, "Acoustophoretic contactless elevation, orbital transport and spinning of matter in air," *Physical Review Letters*, 112 (2014) pp. 024301-1-024301-5.

S. Baer, "Analysis of the particle stability in a new designed ultrasonic levitation device," *Review of Scientific Instruments*, 82 (2011) pp. 105111-1-105111-7.

A. L. Yarin et al., "On the acoustic levitation of droplets," *Journal of Fluid Mechanics*, 356 (1998) pp. 65-91.

Y. Wu, "Development of Free Adjustable Function Generator for Drop-on-Demand Droplets Generation," in *Advances in Intelligent and Soft Computing*, 160, Springer-Verlag (2012) pp. 477-481.

M. Vaezi et al., "A review on 3D micro-additive manufacturing technologies," *Int. Journal of Adv. Manuf. Technol.*, 67 (2012) pp. 1721-1754.

Y. Kim et al., "Design and Fabrication of Electrostatic Inkjet Head using Silicon Micromachining Technology," *Journal of Semiconductor Technology and Science*, 8 (2008) pp. 121-127.

S. Lee et al., "Electrostatic droplet formation and ejection of colloid," *Micro-Nanomechatronics and Human Science*, (2004) pp. 1-6.

M. Colina et al., "Laser-induced forward transfer of liquids: Study of the droplet ejection process," *Journal of Applied Physics*, 99 (2006) pp. 084909-1-084909-7.

P. Galliker et al., "Direct printing of nanostructures by electrostatic autofocussing of ink nanodroplets," *Nature Communications* 3, 890 (2012) pp. 1-9.

* cited by examiner

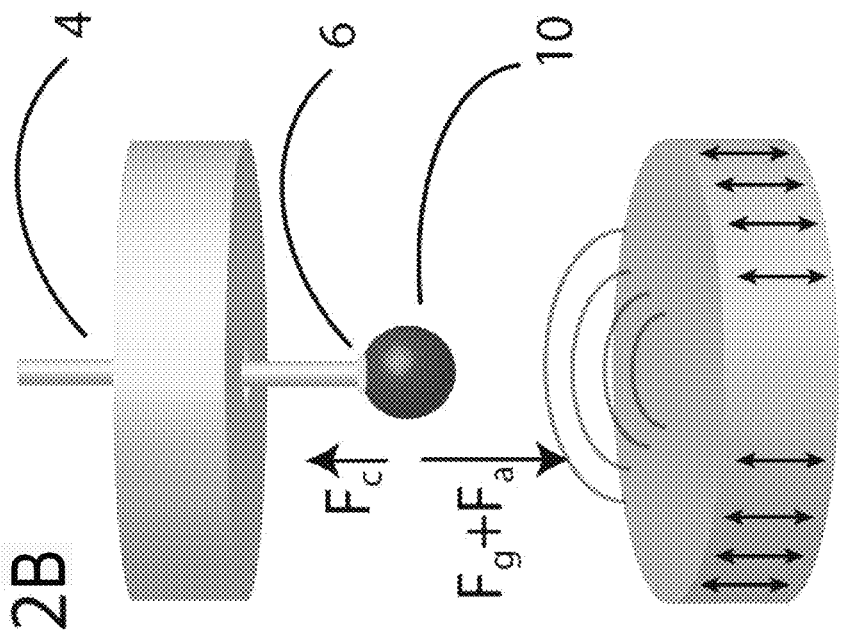
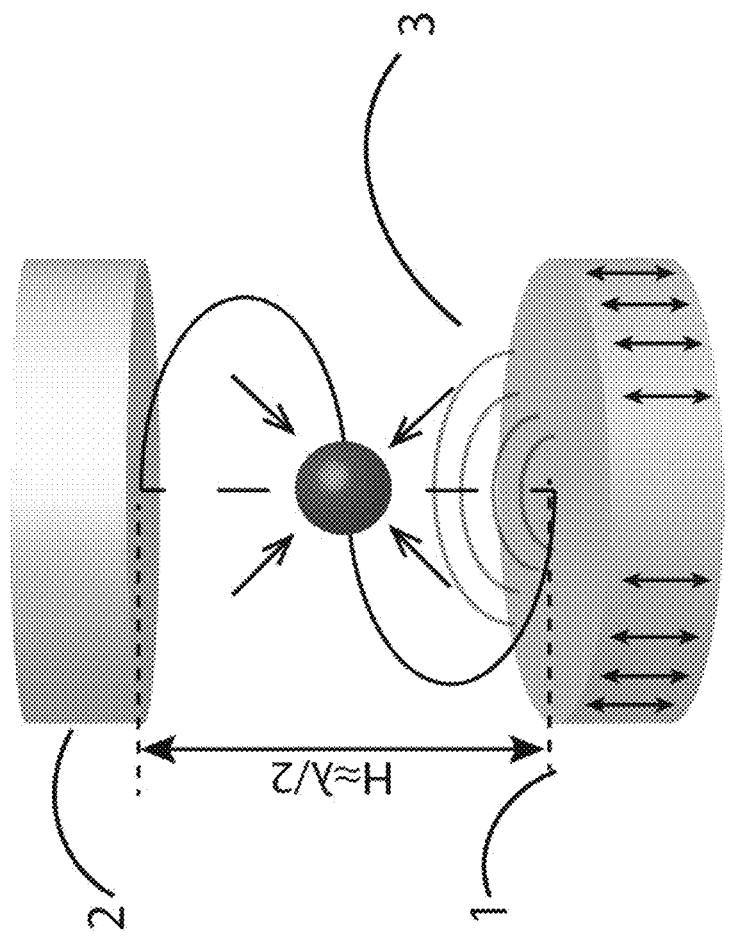
Fig. 2A
Fig. 2B

Fig. 3

ACOUSTOPHORETIC PRINTING APPARATUS AND METHOD

The present patent document is a continuation of U.S. patent application Ser. No. 15/842,366, filed on Dec. 14, 2017, which is a continuation of U.S. patent application Ser. No. 15/113,684, filed on Jul. 22, 2016, which is the national phase of International Application No. PCT/EP2015/051394, filed on Jan. 23, 2015, and which claims the benefit of priority to European Patent Application No. 14000258.5, filed on Jan. 24, 2014. All of the preceding patent documents are hereby incorporated by reference in their entirety.

The present invention relates to a printing apparatus and a printing method for ejection of inks from a nozzle using acoustic forces. One of the technical advantages is that inks of any type and temperature may be printed, which alleviates severe limitations of the current state of the art.

To date, the largest technological limitation in planar and 3D-printing is the ability to dispense materials over a wide range of physical properties, as described by B. Berman, Bus. Horizons 55 (2012).

Today, the technologies of choice for the printing of multiple inks are limited to extrusion and inkjet processes (S. Uperaft, and R. Fletcher, Assembly Autom. 23 (2003); A. Jaworek, and A. Krupa, Journal of Aerosol Science 30 (1999)).

The extrusion process "pushes" a very viscous ink through a small nozzle, very similarly to a toothpaste, while the inkjet process relies on a dynamic ejection principle based on strong pressure wave within the nozzle, generated usually by a piezoelectric device (B. Derby, Annual Review of Materials Research, Vol. 40 40 (2010)).

However, to-date-printing technologies are limited and require cumbersome ink preparation to achieve a degree of functionality. In extrusion printing, the push (pressure) required to eject relatively small features becomes so large that is not practically possible to eject the ink. As a result, it works either with high temperature—to reduce the viscosity of the material at ejection as described by S. Uperaft, and R. Fletcher, Assembly Autom. 23 (2003)—or with specific non-Newtonian fluids that exhibit a shear-shinning behavior (e.g., thixotropy, the higher the stress they experience the lower their viscosity) which is described by K. Sun et al., Adv. Mater. 25 (2013)).

On the other hand, inkjet technology is powerful and it is integrated in today's society (i.e., the inkjet printer). However, this inkjet drop-on-demand (DOD) technology is severely limited to fluids with viscosity approximately 10 times that of water (B. Derby, Annual Review of Materials Research, Vol. 40 40 (2010)).

From a physical point of view, the printing process can be characterized by a non-dimensional number, the Ohnesorge number Oh, and its inverse $Z=Oh^{-1}$, $$Z=(\rho \sigma d)^{1/2}/\mu$$

with $\rho$, $\sigma$ and $\mu$ being the density, the surface tension and the viscosity of the ink, respectively, and d the characteristic droplet size (typically the nozzle diameter).

J. E. Fromm, IBM J. Res. Dev. 28 (1984) as well as N. Reis, and B. Derby, Materials Development for Direct Write Technologies 624 (2000) report that the inherently rapid dynamics of the inkjet printing allows only a narrow window of possible physical properties: literature reports a maximum range of $1<Z<10$.

The constraints of to-date-printing technology means that, for instance, with inkjet technologies even water cannot be reliably ejected: its viscosity is indeed too low ($Z \approx 60$ for droplets of 50 µm in radius). In biology, most of the practical liquids are water-based solutions with volumes in the µl-ml range; indeed pipetting is still the gold standard technique for dispensing in the µl-ml range. At the lower limit of Z ($Z \approx 0.04$), glycerol, a cornerstone ingredient for food and pharmaceutical industries, is too viscous to be ejected.

In general, most inks of interest to realistic applications are based upon colloids or polymers that have relatively high viscosity, and dilution is usually the only available, but not-optimal solution (B. J. de Gans, P. C. Duineveld, and U. S. Schubert, Adv. Mater. 16 (2004)).

As a result of such limitations of the current state of the art in printing methods, a large effort is being expended today to engineer inks matching the limited Z-window of the printer. For instance, additional techniques and preparation steps such as photopolymerization, thermal curing, annealing and additives are investigated or used, respectively.

Summarizing, there is a need for decoupling the printing process from the physical properties of the ink, which would give an unprecedented freedom in choosing the materials that can be printed.

The here-presented printing apparatus and printing method according to the independent claims solves the above-discussed problems. The dependent claims describe preferred further developments.

The printing apparatus according to one aspect may comprise an emitter, which may be arranged within a first fluid. The emitter may be configured to oscillate so that an acoustic field in said first fluid may be generated. Preferably, the emitter may oscillate periodically. The printing apparatus may further comprise a nozzle, which may be placed at a predetermined position within said acoustic field. A second fluid may be arranged within the nozzle.

Further, there may be provided a driving means, which may be connected to the nozzle. The driving means may be configured to drive the second fluid, a predetermined volume, out of the nozzle. In other words, a droplet of second fluid may be driven out of the opening of the nozzle.

Preferably, the driving means may be configured to apply a (back) pressure on the second fluid for pushing out (of the nozzle) a predetermined volume of the second fluid. Alternatively or in addition, the driving means may be a means for reducing the pressure of the first fluid such that the second fluid is sucked out of the nozzle. The drive means may also reduce the viscosity of the second fluid, e.g. thermally, so that the pendant droplet is formed. Also it may change the wettability of the nozzle opening so that the second fluid is driven out by, e.g., the gravity.

Driving the second fluid out of the nozzle, in particular and for example, means to form a pendant droplet at the nozzle tip.

The first and second fluid may be any fluid at any temperature (liquid and gas). Preferably, the first fluid may be air and the second fluid may be a liquid, such as water, an ink/dispersion, a liquid metal or the like. The ink may be, for instance, a pure liquid, a mixture, a colloid, etc. The air may be at high or low temperature. Preferably, first and second fluids both may have room temperature, however, any other temperature is possible. The pressure of the first fluid can possibly be atmospheric but other pressures are feasible. Further, the first and the second fluid may have different temperatures, e.g. the second fluid within the nozzle may be heated or cooled by a heating/cooling means attached to the nozzle or to a fluid reservoir (within the driving means). Alternatively, the first and the second fluid both may be liquids. For example, printing of liquid within an immiscible liquid is possible. In case of liquid-in-liquid printing, the acoustic medium/first fluid may be oil, for instance.

The emitter may be a plate-like member. The emitter may be axi-symmetric, two-dimensional (extrusion in the plane) or otherwise shaped. Preferably, the shape allows for the formation of a standing wave between the emitter and an optional reflector. More preferably, an emitter with a circular, squared, hexagonal, rectangular member/(cross-)section or the like may be used. The emitter can have a flat, convex or concave surface.

The emitter(s) may oscillate(s) periodically with any waveform. Preferably, the oscillation waveform has a sinusoidal shape, e.g. in an ultrasonic range. The emitter may emit sound waves, which may be produced/generated by the oscillations of the emitter in the first fluid. The sound waves may form an acoustic field, which, thus, may be generated by the oscillating emitter.

The oscillation frequency preferably may be in the range of 1 Hz to 1 GHz, and more preferably in the range of 10 Hz to 100 MHz. The wavelength $\lambda$ refers to the wavelength of the emitted/reflected acoustic wave, which is the result of speed of sound c (in the first fluid) divided by the oscillating frequency of the emitter. The wavelength $\lambda$ of the emitted/reflected acoustic wave between emitter and reflector may be preferably in the from range 1 $\mu$m to several meters. Frequencies above 16 kHz (close to the ultrasound range, which is not audible by human hearing) and below 1 MHz offer a most preferred compromise between acoustophoretic printing feature size, strength of acoustic forces, and component manufacturing.

The oscillation velocity amplitude of the emitter may range from 1 $\mu$m/s to 100 m/s.

The emitter(s) may be attached to or may include a piezoelectric transducer, a magnetostrictive transducer or any other means that can provide the needed wave excitation. For example, the emitter may be a plate-like member, which is periodically driven by the piezoelectric transducer connected to it. The emitter may also be an integrated unit (i.e., an oscillator) which comprises the transducer, the plate-like member and preferably further components, such as electric connections and the like.

The nozzle may be a means for holding the second fluid therein or it may be connected to such a means. Preferably, the nozzle may be part (integral or not) of a capillary or any other kind of a tube, and, further, the nozzle may have a tip with a diameter being smaller than the remaining part of the nozzle/capillary. The nozzle tip (and the respective opening) may have a diameter ranging from 0.01 $\mu$m to several millimeters. More preferably, the nozzle tip (and its opening) may have a diameter in a range from 0.01 $\mu$m to 250 $\mu$m. Most preferably, a nozzle tip (and its opening) with a diameter in the range of 1 $\mu$m to 250 $\mu$m offer the best compromise between a minimum acoustophoretic printed feature size and pressure drop within the nozzle.

The nozzle may be connected to a tubing for a fluidic connection between a second fluid reservoir and the nozzle (tip). The tubing may have a diameter ranging from 0.1 $\mu$m to several centimeters.

The nozzle (tip) may be made of any material. Preferably, it may be a tapered glass capillary, a metallic tube, a Teflon capillary or a microfabricated tube. If a glass capillary is used, it may be useful to carry out a hydrophobic treatment, depending on the second fluid, in particular when an ink is printed. For water-based inks (e.g. most of the biological solutions and the currently emerging environment-friendly 3D printing technologies), the wetting of the nozzle (tip(s)) by the ink(s) is reduced by using hydrophobic treatment.

The hydrophobic treatment may also be used for reducing the capillary force Fc. Reducing the capillary force Fc allows for using smaller acoustic forces.

To advance the second fluid, e.g. ink, through the nozzle, a driving means, such as a conventional pressure device/system may already suffice. The pressure may be, preferably, a back pressure, wherein the term "back" indicates a physical position at an opposite side of a (droplet of) the second fluid with respect to the nozzle opening. In other words, if a volume of second fluid is enclosed within the nozzle, the pressure at the nozzle tip/opening would be smaller than the (back) pressure at the opposite side of the volume of second fluid (so that the second fluid is driven in the direction of the nozzle tip). For example, the driving means may include or be a syringe-pump or a pressure controlled (second fluid) reservoir. Further, the driving means may include a (manually, electrically, thermally, and/or mechanically) squeezable member or any other means that would cause a negative pressure gradient in the direction of the nozzle opening (decreasing pressure in the direction of the nozzle opening).

Pushing a predetermined volume of second fluid out of the nozzle (or the nozzle tip/opening, respectively) shall mean that second fluid is driven out of the opening of the nozzle tip so that a pendant drop(let) is formed. The pendant droplet may have an outward-bent meniscus. The back pressure preferably does not drive the droplet to detach from the nozzle; it merely squeezes second liquid out of the nozzle tip/opening so that the acoustic forces of the acoustic field, which surrounds the nozzle tip, may act on the pendant droplet.

The acoustic forces may (mainly) cause the detaching of the pendant/pushed out droplet. This may be achieved by activating the oscillation of the emitter at the point in time at which the droplet shall be detached. Additionally or alternatively, the oscillation of the emitter may be modulated at the point in time at which the droplet shall be detached, for example the modulation may cause the emitter to change the oscillation, e.g. frequency, phase and/or amplitude (in case of multiple emitters, those parameters may be set differently for each emitter), such that acoustic forces are generated which are large enough for detaching of the droplet.

Additionally or alternatively, the oscillation of the emitter can be set constant during the single droplet ejection process. In such a way, a mean-force due to the acoustic radiation pressure can be exerted on the pendant drop that is growing in time (it is pushed/squeezed out of the nozzle). When the droplet is large enough so that the acoustic forces overcome the capillary forces, detachment can be achieved. In all time modulation of the force during the ejection process is possible as needed.

Summarizing, a controlled ejection of predetermined volumes at controlled frequency of droplet ejection is enabled by described use of acoustophoretic forces. The proposed acoustophoretic printing is based on material-independent acoustic/acoustophoretic forces that allow Z numbers in a very broad range from $10^{-3}$ to $10^3$. The acoustic forces are harmless to cells so that a wide range of biological applications is possible. It is further noted, that the printing apparatus/method that is presented here is useful in a wide variety of different printing applications such as those pertaining to complex fluids for flexible electronics, novel micro and nanofluidics technologies, printed energy harvesting and sensing technologies, and also for a wide range of biological applications ranging from wearable and implantable diagnostics and medical devices to bio-synthetic organ printing applications.

The ejected volume can be varied by more than three orders of magnitude by controlling the acoustic forces. In other words, the printing process of the described printing apparatus is decoupled from the physical properties of the second fluid.

The use of an optional reflector, which may be arranged between the emitter and a printing substrate, is a relatively straightforward way for forming a standing wave between the emitter and the reflector. Forming a standing wave has the technical advantage that the acoustic forces are higher than in an acoustic field that does not form a standing wave. However, the presently described printing, generally, is also feasible in an acoustic field that does not form a standing wave.

The printing substrate may be any object or member on which the printing material (second fluid) shall be deposited/printed. The geometry of the substrate is not restricted to flat planar surfaces, but may be arbitrarily shaped.

Placing the reflector between the printing substrate and the emitter shall not exclude that further components or objects may be placed in-between. The emitter, the reflector and/or the substrate do not need to be connected to each other. However, a frame or the like may connect, in particular, the reflector and the substrate with each other. The components of the printing apparatus may also be placed within a casing.

Preferably, a surface of the reflector may be positioned at a (defined) distance H from (a surface of) the emitter. More preferably, the distance H between the surfaces of the emitter and the reflector may be a multiple of $\lambda/2\pm0.2\lambda$, e.g. $0.5\lambda$, $\pm0.2\lambda$, $1.0\lambda$, $\pm0.2\lambda$, $1.5\lambda$, $\pm0.2\lambda$, etc. Setting the distance H accordingly enables imposing an acoustic standing wave between the emitter and the reflector. Typically, a distance $H\approx\lambda/2$ offers the strongest acoustic standing wave in regard of acoustic forces.

The surface of the reflector, which may be placed at the half of the wavelength $\lambda$, may preferably be an upper surface of the reflector. This surface of the reflector may oppose a (lower) surface of the emitter from which sound (acoustic) waves are emitted. In case the emitter is placed below the reflector, the surfaces would be swapped.

The geometry of the reflector may be axi-symmetric, two-dimensional (extrusion in the plane) or it may have any other geometry that allows for the formation of a standing (first) wave between the emitter and a surface of the reflector. Preferably, an emitter with circular, squared, hexagonal or rectangular (cross-) section/surface may be used and a reflector with a characteristic dimension of its (cross-) section (e.g. the upper surface) of the same order of magnitude.

Moreover, different combinations and configurations of the emitter and reflector setup are possible: the emitter and the reflector may be placed such as described above. The reflector may be entirely omitted. A plurality of emitters may be arranged next to each other or along a shared longitudinal axis. The emitter and reflector may be placed either up or down.

The reflector may have a reflectorless chamber (or conduit) which may preferably be positioned along a printing axis between the emitter or nozzle tip and the printing substrate. More preferably, the reflectorless chamber may include or be a through-hole through the reflector; accordingly, the reflector may be hollow.

The term "reflectorless" shall mean, in particular, that there is no reflector arranged along the printing axis or the entire longitudinal axis of the reflectorless chamber, wherein, preferably, the printing axis and said longitudinal axis may be identical or parallel. The printing axis may be (or at least stretch along) an imaginary/virtual (preferably straight) connecting line between the opening of the nozzle and a point on the substrate on which the second fluid/droplet shall be printed/deposited. The printing axis/vector does not necessarily have to point in the direction of the gravitational force. The nozzle axis does not necessarily have to be parallel to the printing axis, it may be arranged with an angle with respect to the printing axis. If there is an angle between the printing axis and the nozzle axis, preferably, it may be between >0° and <=90°.

A characteristic dimension of the reflectorless chamber may be the diameter in case, e.g., the conduit/reflectorless chamber would have a circular geometry or a side length, e.g., in case the reflectorless chamber would have a square geometry, etc. The reflectorless chamber may also have a varying cross section (along its entire length). The reflectorless chamber may also be square, hexagonal, elliptical or the like. It can be smaller at the entrance and bigger at the exit and vice versa. The most general description of the reflectorless chamber may be that it should be a confined space with an opening at its top and at its bottom.

The characteristic dimension may be smaller or equal to the wavelength $\lambda$ of the first standing wave between the emitter and the (upper or relevant) surface of the reflector. More preferably, the characteristic dimension of the reflectorless chamber may be in the range of $0.01\lambda$ to $\lambda$.

The configuration in which the characteristic dimension equals or exceeds the wavelength $\lambda$ may also represent a manifestation of the herein-described printing apparatus, which does not have the optional reflector. In this case, the acoustic field/sound waves do not necessarily form a standing wave so that the acoustic forces may be increased by increasing the amplitude of the acoustic waves or the like. Further, as described above, the acoustic forces may also be increased, in particular if no reflector is used/no standing wave is formed, by focusing sound waves of a plurality of emitters on a specific point in space (as described below). Alternatively, the printing substrate may also act/be used as reflector. The emitter and the substrate would be arranged such as to have the defined distance H as described above. Further, however, it may also be an alternative to have a reflector with a reflectorless chamber having a characteristic dimension that equals the wavelength $\lambda$.

The reflectorless chamber preferably has a constant characteristic dimension along the ejection line/printing axis—preferably a cylindrical section with a constant radius. However, the reflectorless chamber may also have a varying cross section along the printing axis. For instance, it may also be conical, increasing the characteristic value while exiting the chamber. In general, a larger characteristic value at the exit may allow for a more stable droplet ejection. The reflectorless chamber may enhance the acoustic forces and eject droplets at the bottom of this reflectorless chamber, so that the droplets may be deposited on any object or substrate. A second standing wave may be present within the reflectorless chamber which is up to 1-100 times enhanced, in regard of the acoustic forces, than the first standing wave between the emitter and the reflector (the relevant surface thereof).

The height Hh of the reflectorless chamber or the entire reflector may be in the range of $0.01\lambda$ to $100\lambda$. More preferably, the Hh-range for a good ejection is from 0.1 to $10\lambda$.

The nozzle tip may be positioned in any place/at any position within the reflectorless chamber or above or below. Typically, if Hh is the height of the reflectorless chamber, the preferred region/position to place the nozzle tip for a reliable ejection is where a net force pulling the pendant droplet is present. A preferable range for positioning the nozzle tip may be from −0.5 Hh (negative means above the chamber) to 1.5 Hh (bigger than 1, below the exit of the chamber). In other words, "−0.5 Hh" would mean that the nozzle tip is arranged between the emitter and the upper surface of the reflectorless chamber/reflector at a position which has a distance of a half of the length of the reflectorless chamber from the upper surface of the chamber/reflector. "1.5 Hh" would mean, accordingly, that the nozzle tip is placed at a position, which has a distance of a half of the length of the reflectorless chamber from the lower surface/exit of the chamber/reflector. More preferably, the nozzle tip is arranged within the reflectorless chamber. Even more preferably, the nozzle tip is placed within the reflectorless chamber at a position which is in the range from the exit of the reflectorless chamber to Hh/3. In this range, in particular, a large net force pulling on the pendant droplet is present.

The printing apparatus may comprise a plurality of emitters. The emitters may be arranged such that emitted sound waves are focused on a predetermined point in space within the (first) acoustic field. In other words, the acoustic field of the different emitters may be configured such that the acoustic forces of the different emitters add up at the predetermined point in space. This may be achieved by experimentally adjusting the orientation of the different emitters. The acoustic forces of the different acoustic fields of the emitters may also be calculated or simulated for finding the desired arrangement. The multiple emitters may also be used to form a standing wave in a predetermined point, which may be achieved in a manner similarly to focusing, but with different emitted sound/acoustic wave characteristics of the different acoustic waves. The predetermined point in space is preferably the predetermined position of the nozzle tip. The predetermined position may also be in the vicinity thereof. Here, "vicinity" may mean that the nozzle tip is placed in an area at which the acoustic forces of the different emitters add up. The area/vicinity may mean that the nozzle tip is located within a range of few micro- to centimeters from the predetermined point in space.

The advantage of this aspect of the printing apparatus is, especially, that the acoustic forces of the plurality of emitters add up such that the acoustic forces can reach a value being sufficient for the acoustophoretic printing—even without using a reflector or a standing wave. This reduces the complexity of the printing apparatus and provides additional degrees of freedom in regard of the configuration/design of the apparatus. However, it is noted, that the emitters may also be arranged such that a standing form wave is formed without a reflector, as it will be described further below.

The acoustic field may have a force gradient of the acoustic force(s) that may point into the direction of printing, and the predetermined position of the nozzle tip may be at a point or in the vicinity of a net (acoustic) force which pulls/draws the pendant droplet away/detaches it from the nozzle tip and accelerates the detached droplet. The net force is generated by a force gradient(s) of the acoustic potential of the acoustic field. The force gradient may be adjusted by the presence of the droplet, the nozzle tip, the reflector, the substrate, the emitter and their shapes/geometries. The necessary gradient of the acoustic force and the necessary net force, respectively, may be calculated and/or simulated.

For example, a gradient of acoustic forces within an added up acoustic field, preferably, may already be generated by the distances between the emitters and the point in space, at which the nozzle tip is placed. The presence of the nozzle tip and of the droplet may further generate or alter the force gradients. The force gradient(s), which may preferably point from the nozzle tip to the printing direction, i.e. acoustic forces being larger at the nozzle tip than downstream the printing direction, may be obtained by simulation, calculation and/or experiment. For instance, the force gradient can be obtained by a non-symmetric standing wave generated by two emitters, or by an emitter and a reflector shaped and oriented in a specific manner. This also holds for the general and other configurations/examples of the printing apparatus, e.g. the configurations as set forth above.

The emitter(s) may have an integrated reflector, which shall mean that the reflector and the emitter are integrated into a single component. The integrated reflector may, for example, be a specifically shaped side wall of the emitting surface (emitter surface) or the like, which may focus/reflect the sound waves. More preferably, said reflector may be formed such that the sound waves of the emitter are focused on a predetermined point in space, at which the predetermined position of the nozzle tip may be located (or in the vicinity thereof). The shape of the reflector may be individually adapted to the emitter of a printing apparatus, and may be simulated or calculated, for instance. E.g., the emitter can have a flat, convex or concave surface. It can also be shaped in a concave way so that the emitting surface at a point can also act as a (self-/integrated) reflector for another correspondent point of the same emitting surface.

The technical advantage of using a reflectorless chamber, in which a (second) standing wave may be formed, is that the acoustic force(s) of the acoustic field may be increased up to 1 to 100 times compared to the (first) standing wave in the (first) acoustic field between the emitter and the reflector. The increase is i.a. effected by the smaller characteristic size of the reflectorless chamber compared to the space/chamber between the emitter and reflector. The increase of the acoustic forces i.a. allows for printing smaller features sizes.

Further, a plurality of nozzles and/or reflectorless chambers may be arrayed, or arranged in an array, for forming a multi-nozzle print head. The multi-nozzle print head i.a. allows printing of a plurality of droplets at the same time and at the same or different points on the substrate.

The nozzle may have a heating means and/or a cooling means for heating/cooling the second fluid to a predetermined temperature. The means may also be attached to the nozzle. In this way, the temperature of the second fluid, for example, may be increased so that the viscosity may be reduced, which may allow for reducing the acoustic forces or for printing smaller feature sizes/droplets. The heating means may be a heating wire being wound around the nozzle. Other heating sources may be used, too. The cooling means may be a Peltier element, by thermal conduction with another solid, convection with a fluid or the like.

A print head may comprise a plurality of reflectorless chambers so that a plurality of integrated ejectors may be formed, which advantageously allow for serial and/or parallel printing (time- and/or spacewise). The term "print head" may indicate a member in which the exit(s) of a reflectorless chamber(s) may be formed. For example, the print head may be integral with the reflector or the emitter. Further, the print head may also be a separate/additional component.

The nozzle and the drive means may be connected via a tubing. The tubing may be introduced into the printing apparatus at a side surface thereof, preferably below the emitter. Alternatively the tubing may be introduced through a hole in the emitter. The tubing may include, in a cost optimal configuration, flexible plastic tubes so that an economic and flexible printing apparatus can be built.

The predetermined volume of second fluid, which may be pushed out of the nozzle opening by the back pressure, may range from nl to µl. This broad range allows printing extremely small as well as relatively large feature sizes. The flexibility in regard of the printable/ejectable volume is a further technical advantage compared to the to-date printing technologies, which are more limited in this regard.

An (electric) control means, such as a computer or the like, may be configured to control at least the oscillation of the emitter, the pressure application of the drive means and/or a driving of the printing apparatus to a printing position in relation to a printing substrate. E.g., the printing apparatus may include or may be connected to a movable frame, which may be (automatically) driven to a (plurality of) printing position(s). Further, the application of the back pressure may be automated, as well as an (de-) activating of the emitter oscillations. Hence, computer-controlled, automated printing is enabled.

A further aspect may comprise a method for ejecting a fluid from a nozzle. Preferably, the method makes use of at least one example of the above-described printing apparatuses according to the invention. Preferably, the method allows ejecting a second fluid from a nozzle, which may be arranged within a first fluid. The method may have a step of forming a droplet at a nozzle tip. In other words, a predetermined volume of second fluid may be driven out of the nozzle tip. The nozzle tip may be arranged within an acoustic field generated by an (periodically) oscillating emitter. The second fluid may be driven by applying a (back) pressure on the second fluid.

Further, the method may include the step of generating an acoustic field with an acoustic force gradient, which may point from the nozzle tip to a printing substrate by activating a periodically oscillating emitter and/or by modulating the oscillation of the emitter.

Summarizing, the proposed acoustophoretic printing is based on material-independent acoustic forces. Such forces allow a possible Z number spanning seven orders of magnitude, from $10^{-3}$ to $10^3$. The acoustic forces have been shown to be harmless to cells (D. Foresti et al., P Natl Acad Sci USA 110 (2013)). Therefore, they can be used for a wide range of biological applications. In addition, the ejected volume can be varied by more than three orders of magnitude simply by controlling the acoustic forces.

The technical advantages of the presented acoustophoretic printing allow a use in a plurality of fields of application: In medicine, for example, 3D-printing of human organs research may strongly benefit by acoustophoretic printing (K. Pataky et al., Adv. Mater. 24 (2012)). In biology, solutions of living cells in the nl-µl range may be deployed acoustophoretically, minimizing contamination (M. T. Guo et al., Lab on a Chip 12 (2012); K. Choi et al., Annual Review of Analytical Chemistry 5 (2012); S. Ekins, J. Olechno, and A. J. Williams, Plos One 8 (2013)). In electronics, new low-viscosity silver reactive inks, with a conductivity equivalent to bulk silver, may be DOD printed by this acoustophoretic technique (S. B. Walker, and J. A. Lewis, J. Am. Chem. Soc. 134 (2012)). In material manufacturing, a new method may complement the microfluidics technologies for microparticle production (H. C. Shum et al., Macromol. Rapid. Comm. 31 (2010)).

In the following, examples are set forth with reference to the attached schematic drawings:

FIG. 1 An acoustophoretic ejection system/acoustophoretic printing apparatus. A reflectorless chamber is halved only for illustration purposes. The close ups show ejected glycerol and water droplets (scale bar=500 µm).

FIG. 2A Acoustic levitation in a conventional (state-of-the art) standing wave levitator and acoustic force distribution. In this case, one acoustic node is present (H≈λ/2).

FIG. 2B When a pendant drop is placed within the conventional standing wave levitator, it experiences both body forces (gravitational, $F_g$) and surface forces (acoustics, $F_a$, and capillary, $F_c$).

Figure 3:
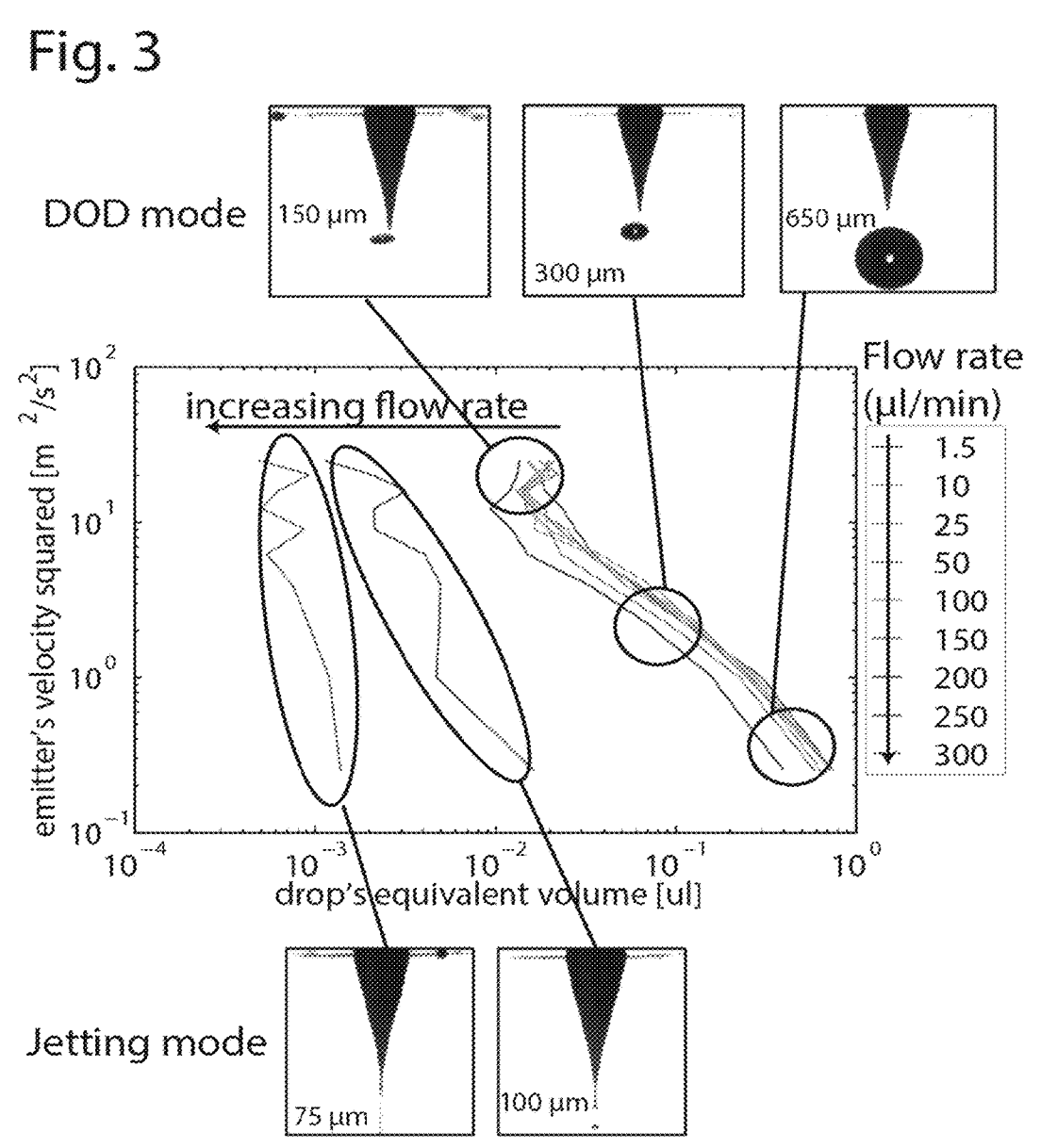

FIG. 3 Acoustophoretic printing size control capabilities. More than three orders of magnitude of volume for DOD ejection can be controlled with the here-described acoustophoretic printing apparatus/method.

Figure 4:
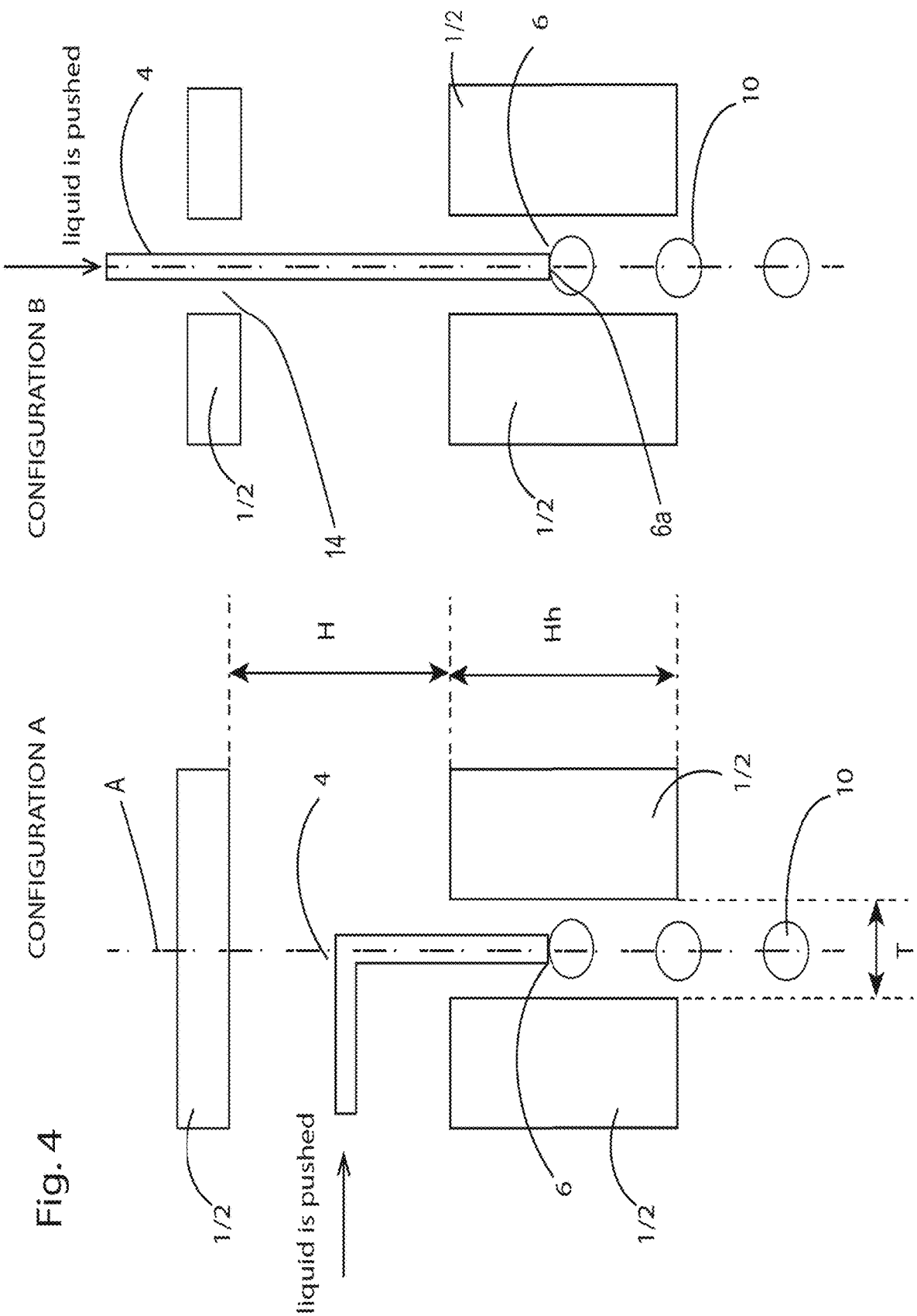

FIG. 4 Two preferred alternative configurations of an acoustophoretic printing apparatus: Configuration A) A nozzle is introduced from a side of a chamber (with a main/first standing wave) and reaches a reflectorless chamber where a secondary acoustic standing wave is present. Configuration B) A nozzle enters from a hole on a top of the emitter/reflector and ends in a reflectorless chamber.

Figure 5:
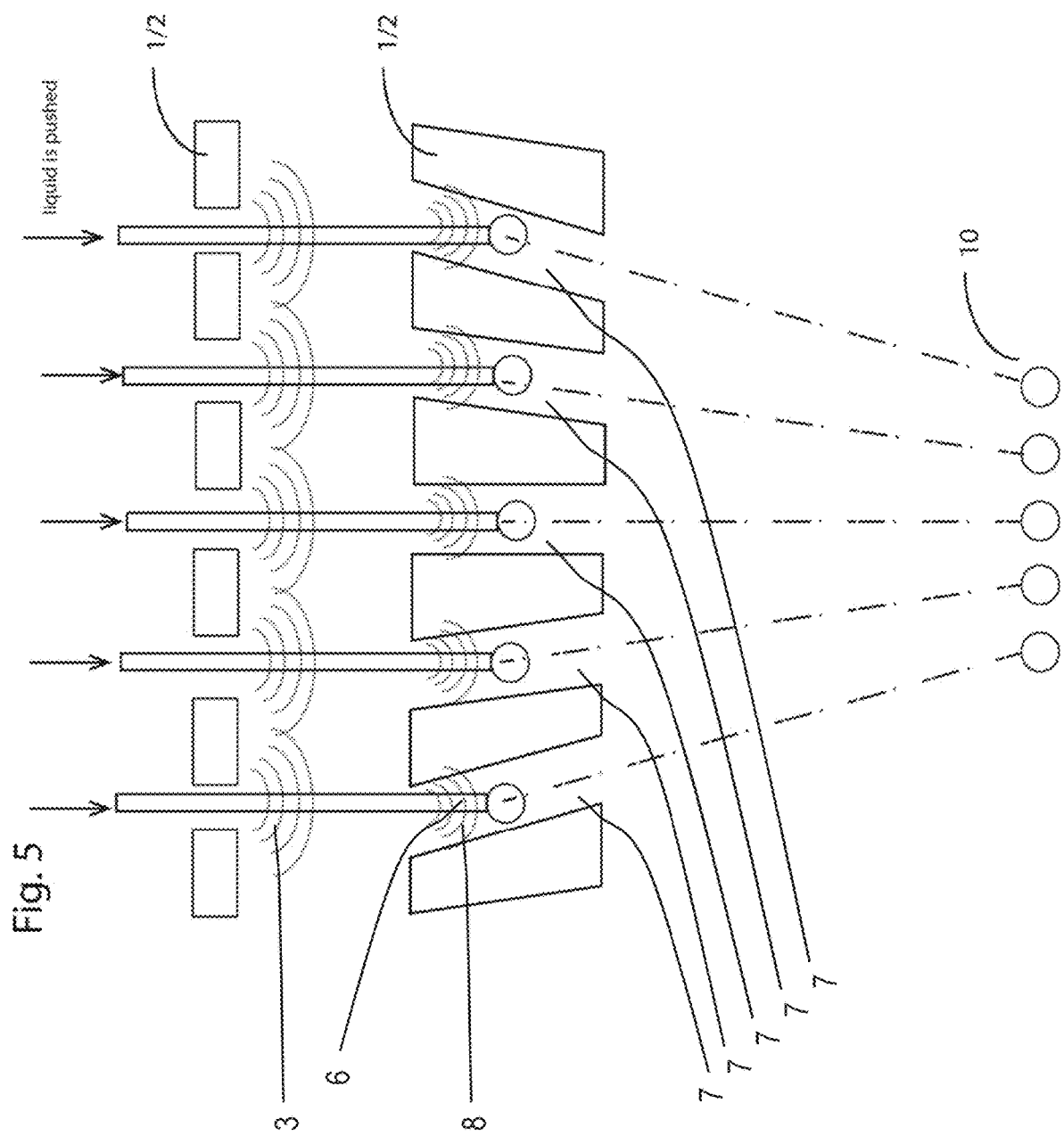

FIG. 5 Multiple nozzle configuration of an acoustophoretic printing apparatus. By replicating a configuration as depicted in FIGS. 4a, 4b, multiple droplets (also of different inks) can be simultaneously ejected. The ejection angle allows for a fine printing resolution at the substrate/target surface.

Figure 6:
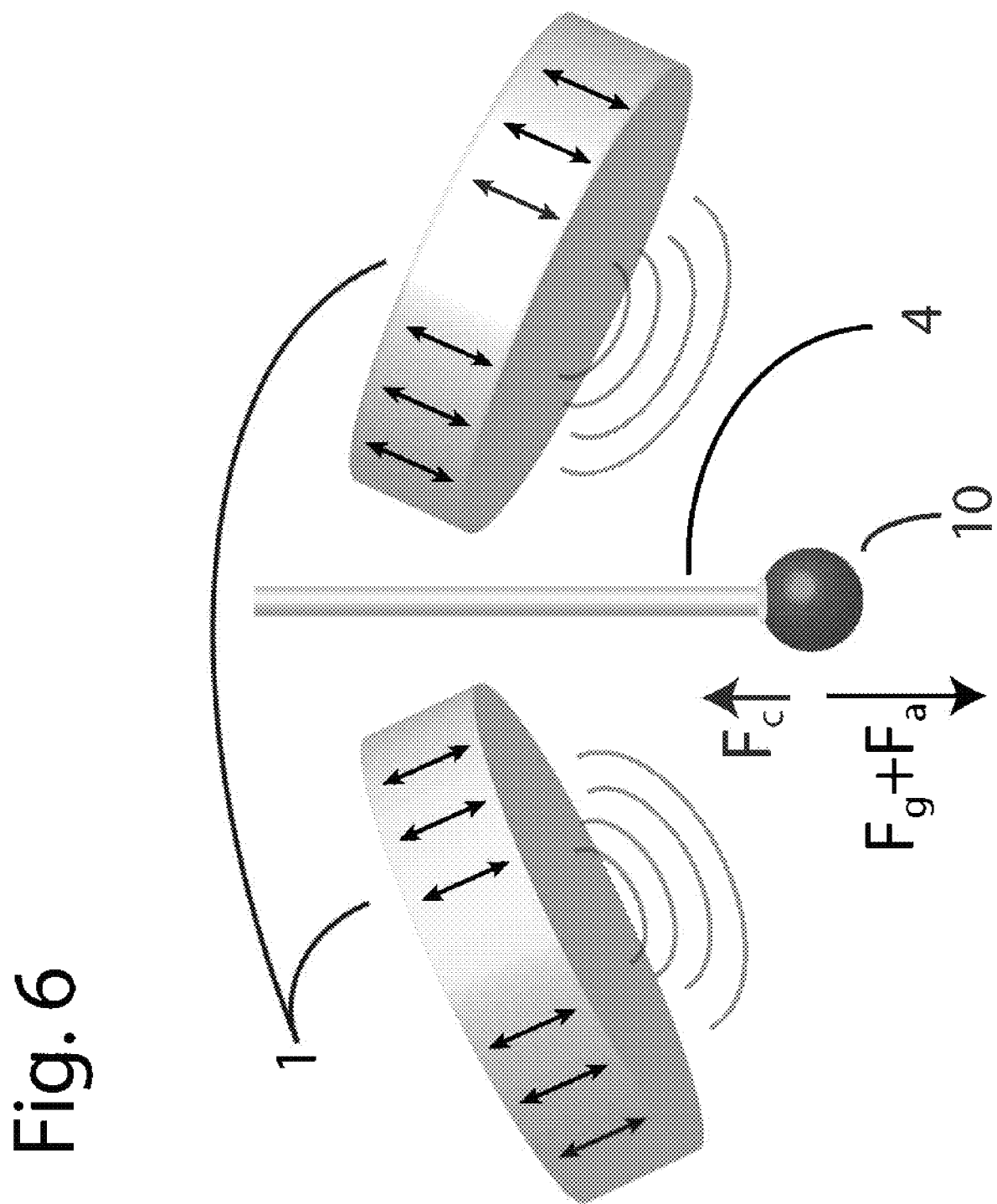

FIG. 6 Two emitters are used to achieve a standing wave without a reflector.

Figure 7:
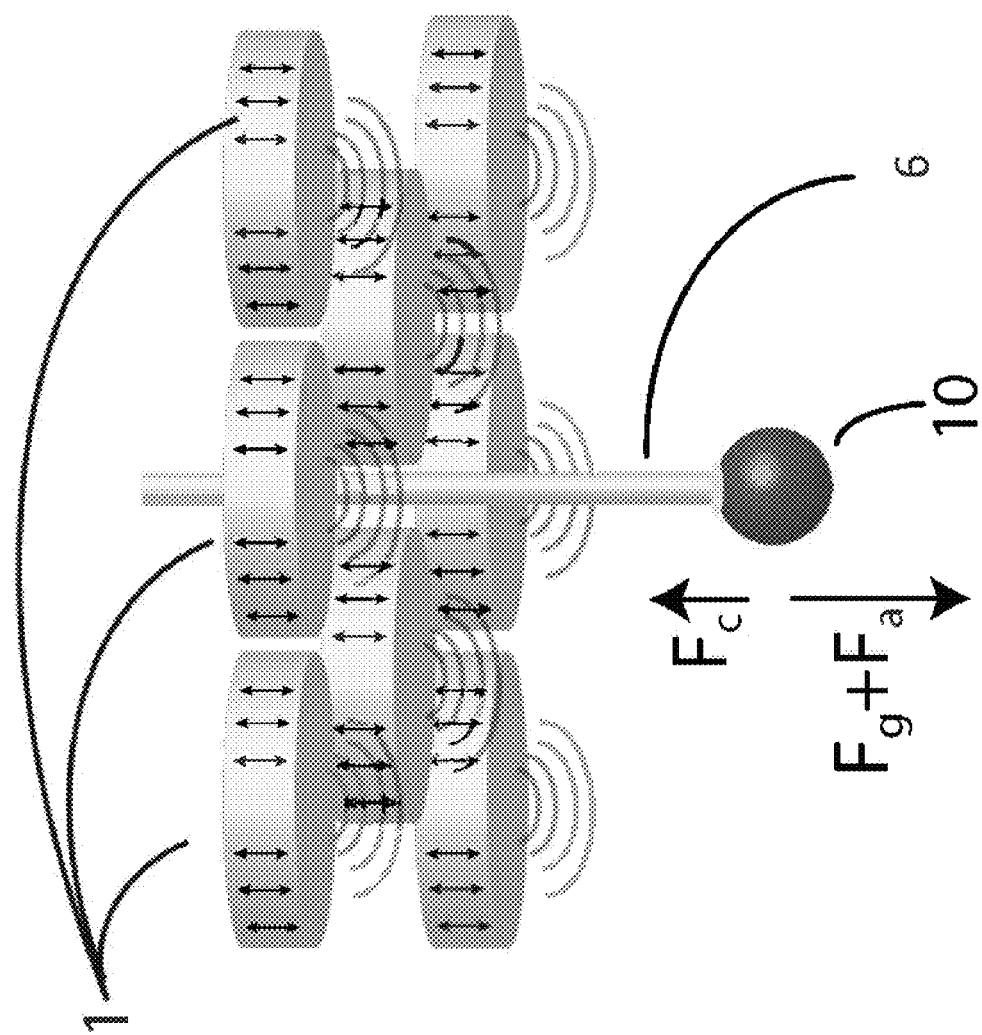

FIG. 7 Multiple emitters can be used to enhance the acoustic radiation pressure at a single focal point or to create a vortex beam.

Figure 8:
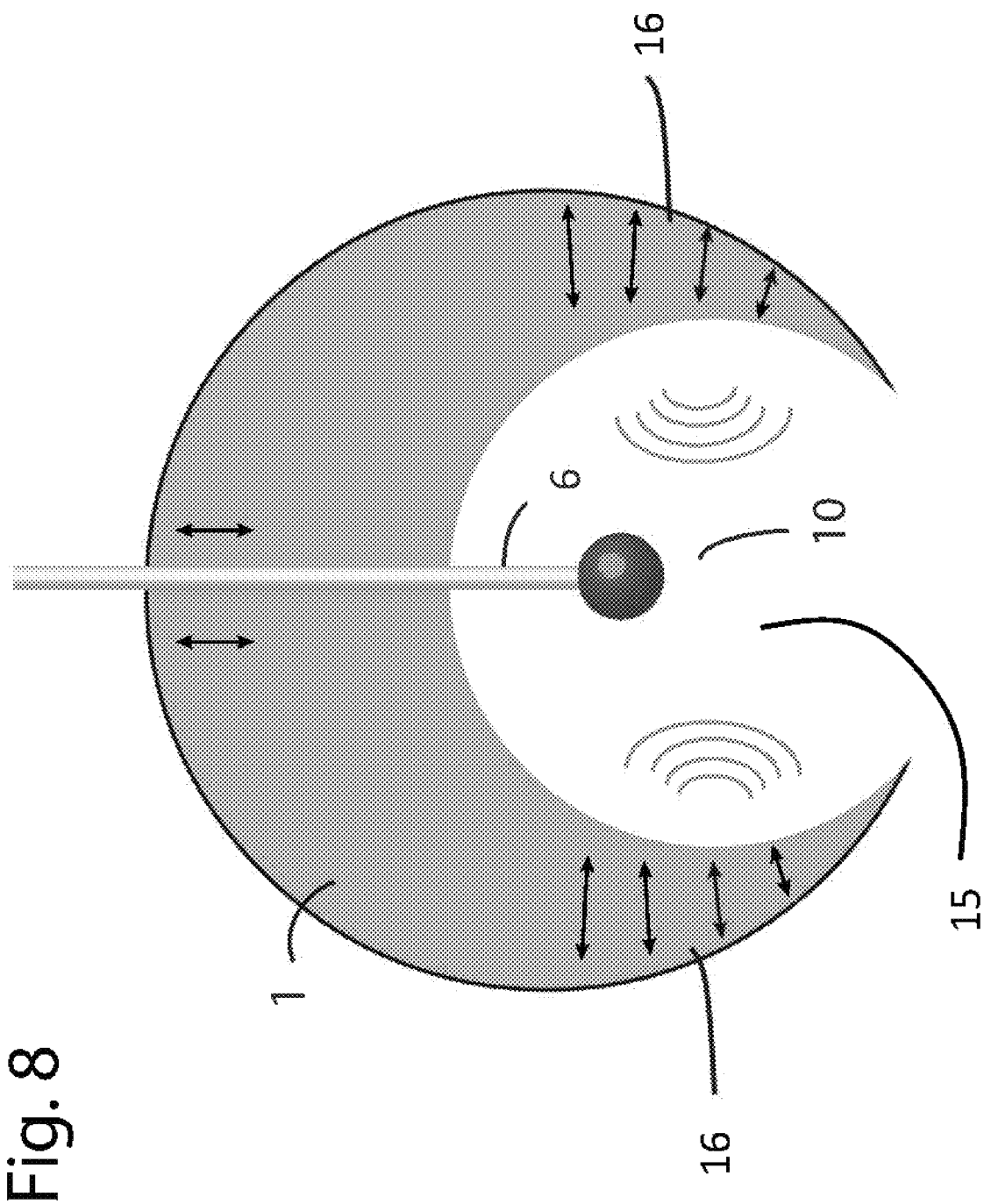

FIG. 8 An emitter can be designed so that it can simultaneously act as a reflector. Both sides oscillate from opposite direction, creating a standing wave.

Figure 9:
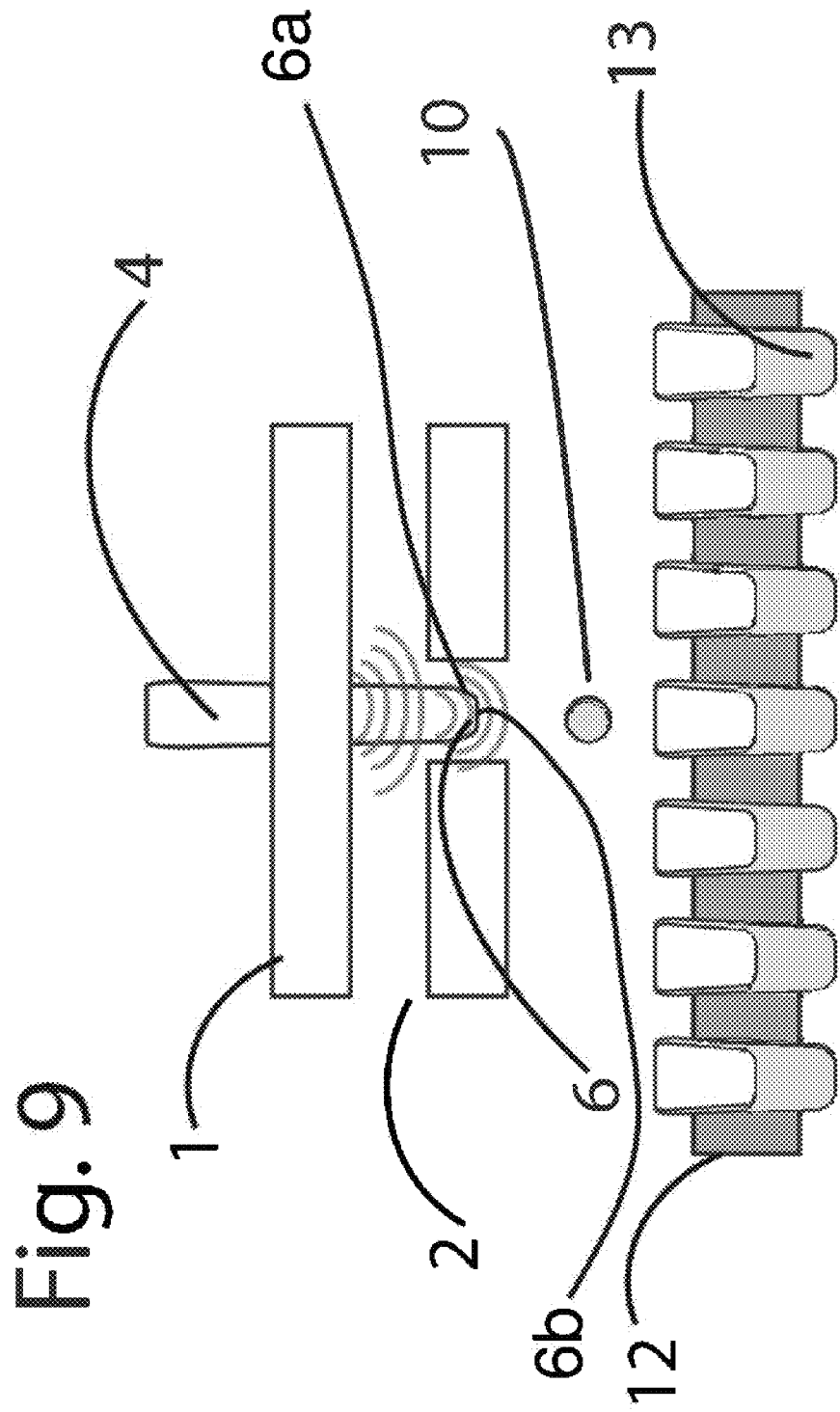

FIG. 9 An acoustophoretic printing apparatus used as a sample dispenser for biological solutions in the nl-µl range volume for standard 96, 384 and 1536 well plates.

Figure 10:
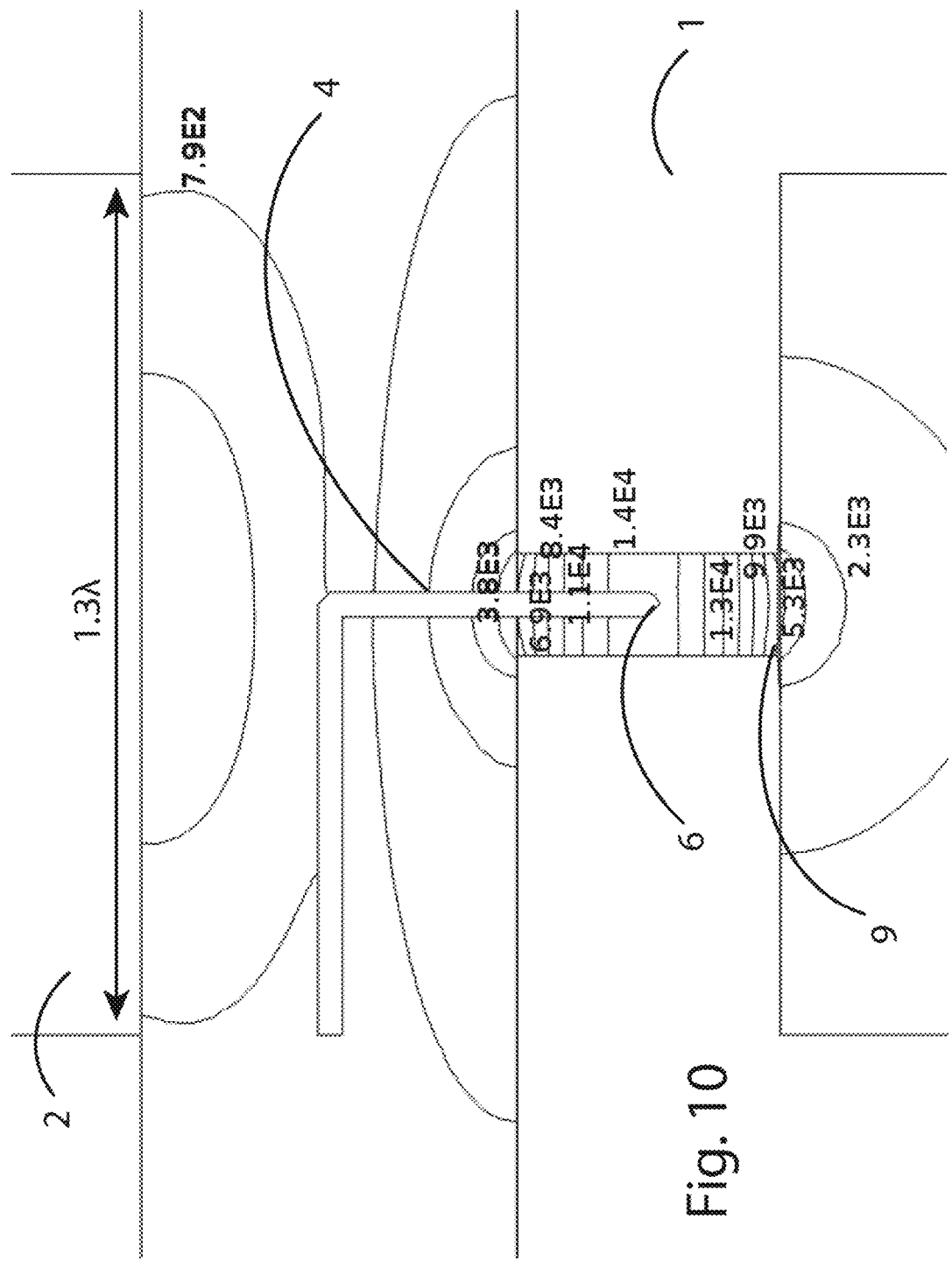

FIG. 10 An exemplary numerical simulation of the acoustic pressure (in Pascal) within a preferred configuration of an acoustophoretic printing apparatus. In this particular case, the maximum acoustic pressure in the primary chamber is ≈3300 Pa, while in a reflectorless chamber the pressure is ≈15000 Pa. Since the acoustic forces are proportional to the square of the acoustic pressure, an enhancement of ≈25 times is expected.

References in the specification to a given example indicate that the example described may include a particular feature, structure, or characteristic, but every example may not necessarily include the particular feature, structure, or characteristic. It should be noted that the description and drawings/figures merely illustrate the principles of the proposed apparatus and method. It will thus be appreciated that those skilled in the art will be able to devise various combinations and the like that are not explicitly described or shown herein. Furthermore, all examples recited herein are principally intended expressly to be only for pedagogical purposes to aid the reader in understanding the principles of the proposed method and apparatus and the concepts contributed by the inventors to furthering the art, and are to be construed as being without limitation to such specifically recited examples and conditions. Moreover, all statements herein reciting principles, aspects, and embodiments, as well as specific examples thereof, are intended to encompass equivalents thereof.

FIGS. 2A and 2B show conventional configurations of a standing wave levitator, which are used for trapping particles or fluids at a location of an acoustic node between an emitter 1 and a reflector 2. The emitter 1 generates an acoustic field 3 of sound waves, which apply an acoustic force 3a (radiation pressure) on objects, which are positioned within the acoustic field 3. In the typical configuration of a standing wave levitator, as depicted in FIGS. 2A and 2B, a (detached) droplet 10 is trapped at the location of the acoustic node (see FIG. 2A). An ejection of the trapped droplet 10 with the conventional standing wave levitator is very difficult.

The here-described printing apparatus and the printing method make use of the same physical principle as the conventional standing wave levitator, however, different to the standing wave levitator, allow ejecting droplets, in particular, from a nozzle.

The physical principle of levitating objects by acoustic forces will be briefly described: sound waves apply forces on objects. The acoustic forces 3a, 8a, which are used in connection with the here described printing apparatus and printing method, in particular, arise from radiation pressure. Radiation pressure is a nonlinear effect of the acoustic field 3 (E. H. Brandt, Nature 413 (2001)). Based on wave scattering, acoustic forces are practically material independent, in particular when handling samples in air (D. Foresti, and D. Poulikakos, Physical Review Letters (2014)). Albeit radiation pressure is usually relatively weak, it can levitate, e.g. in open air, objects as heavy as steel marbles. The levitation can be achieved, e.g., when properly focusing the radiation pressure (N. Bjelobrk et al., Appl Phys Lett 97 (2010); D. Foresti et al., Sci Rep-UK 3 (2013)). To describe modulation of such acoustic forces 3a, 8a in time and space that can facilitate transport of matter, the term acoustophoresis is used (D. Foresti et al., P Natl Acad Sci USA 110 (2013)).

The enhancement of such forces 3a, 8a is typically, but not necessarily, achieved by generating an acoustic standing wave, established between an emitter 1 and a reflector 2 (see FIG. 2A; and D. Foresti, M. Nabavi, and D. Poulikakos, Journal of Fluid Mechanics 709 (2012)). The resonant condition suggests the distance H between an oscillating source and a reflective surface to be about a multiple of half of the wavelength λ. When H≈λ/2, a pressure node is generated in the middle of the levitator. Below the node the acoustic forces 3a, 8a oppose the gravitational force, and vice versa above the node (FIG. 2A). Acoustic levitation is indeed intrinsically stable.

When a drop 10 of radius $R_s$ is introduced in the system, as it is exemplarily shown in 2B, wherein the drop 10 is pendant from a nozzle 6 of diameter d, the drop 10 experiences a force that is the sum of the capillary force $F_c = \pi \sigma d$, the gravitational force $F_g$ and the acoustic force $F_a$ (FIG. 2B).

If $F_c > F_g + F_a$, the droplet 10 stays attached to the nozzle 6, otherwise the droplet 10 will detach. The acoustic force $F_a$ scales with the volume of the drop/droplet 10 (being attached to the nozzle 6), hence $F_a \propto R_s^3$. Since the same scaling applies for the gravity force, an acoustic acceleration $g_a$ can be introduced, which is similar to the gravitational acceleration g, and the following relationship is obtained:

$$F_c = \pi \sigma d = F_g + F_a = \frac{4}{3}\pi R_s^3 \rho(g + g_a) \Rightarrow R_s = \sqrt[3]{\frac{3d\sigma}{4\rho(g + g_a)}}$$

The above relationship tells that the droplet size at detachment is controllable by controlling the acoustic acceleration $g_a$, i.e., the acoustic forces $F_a$.

Hence, differently from conventional inkjet printing, the acoustphoretically detached droplet 10 is pulled out of the nozzle 6 by/from the external acoustic field 3 (specifically, the acoustic forces 3a, 8a resulting therefrom) instead of being pushed by an internal pressure wave. The external acoustic field 3 is tunable. The fluid dynamics within the nozzle 6 do not limit the printing. The above relationship shows the independence of the printing method from the viscosity of the fluid (for Newtonian fluids).

A preferred example of the here-introduced acoustophoretic printing apparatus may be called a reflectorless standing wave levitator. A schematic representation of is shown, e.g., in FIG. 1.

The acoustophoretic printing apparatus of FIG. 1 has an emitter 1 which (periodically) oscillates so that sound waves are emitted that form an acoustic field 3 within a first fluid (not explicitly shown). The first fluid is preferably air. In a possibly simplest configuration, the emitter 1 is a planar or curved member with a circular, elliptic, quadratic, rectangular or the like cross-section, which oscillates. The emitter 1 may be connected to an oscillator (not shown) which excites/moves the emitter 1.

Further, the acoustophoretic printing apparatus according to the example of FIG. 1 has a nozzle 6 being placed inside a reflectorless chamber or conduit 7. The reflectorless chamber 7 is formed as a through-hole, which extends from an upper surface 2a of a reflector 2 to a lower surface 2b of the reflector 2. FIG. 1 shows a preferred example of an annular-shaped reflector 2. The axis of symmetry of the reflector 2 is arranged on a printing axis A (see FIG. 4), along which droplets 10 of second fluid are ejected. The surfaces 2a, 2b are shown as planar surfaces. Said chamber 7 "traps" a (second or secondary) acoustic standing wave 8.

The reflector 2 of said preferred configuration of an acoustophoretic printing apparatus may have one or more of the following three characteristics: (1) There is no reflector on top or bottom of the nozzle axis; hence, the name reflectorless. In other words, the reflectorless chamber 7 connects two openings being arranged within the upper and lower surface 2a, 2b of the reflector 2. (2) The acoustic force 3a, 8a (inside the chamber 7) is enhanced up to 1-100, e.g. 30 times, compared to the above-described typical conventional levitator configuration as shown in FIG. 2A. (3) A force gradient of the acoustic forces 3a, 8a, in particular with a top force stronger than a bottom force (directions according to FIG. 1), is present. A net force is, i.a., present because of the optimal design of the reflectorless chamber 7, e.g. the (relatively small) diameter of the reflectorless chamber 7 compared to the wavelength of the acoustic field. This particular distribution enables the droplet 10 to be detached, accelerated and ejected out of the reflectorless levitator/acoustophoretic printing apparatus and to be printed on any object/(printing) substrate 11.

Further, a drive means 5, e.g. a syringe pump as shown in FIG. 1, is used to feed the nozzle 6, via a tubing 4, with droplets on-demand so that a highly-precisely controlled droplet ejection is possible. The tubing 4 may be flexible, and, for instance, the tubing 4 may be made from flexible plastics.

Proof of principle experiments with water and glycerol confirmed the droplet ejection (FIG. 3). For the experiments, a reflectorless chamber 7 diameter of 2 mm and with a length of 5 mm was used. The emitter diameter was set to 17 mm (circular), the height of the reflector emitter (shaped as shown in FIG. 1) was 7 mm, the nozzle tip 6a was placed at Hh=0.7 (i.e. in the lower part of the reflectorless chamber diameter 7). The distance H between the upper surface 2a of the reflector 2 and the lower surface 1a of the emitter 1 was $0.52\lambda$. A drive means 5, a syringe pump, imposed a flow rate through the nozzle 6, while the acoustic forces 3a, 8a can control the droplet size detachment up to 3 orders of magnitude with a single 50 µm diameter nozzle (75 µm<Rs<650 µm). The ultrasonic frequency, which was used in this example experiment, was set to 25 kHz. With the interplay of flow rate and acoustic force 3a, 8a, ejection frequency can go as high as 2 kHz in the DOD mode or several kHz in continuous jetting mode. Additionally, the extrusion mode can also be potentially used, since the ink flows through a nozzle 6.

Further, in addition to the experimental results, a numerical simulation was carried out. FIG. 10 presents results of an exemplary numerical simulation of the acoustic pressure (in Pascal) within a preferred configuration of an acoustophoretic printing apparatus. In this particular example case, the maximum acoustic pressure in the (primary) chamber (between the emitter 1 and the reflector 2) is ≈3300 Pa, while in the reflectorless chamber 7 the pressure is ≈15000 Pa. Since the acoustic forces 3a, 8a are proportional to the square of the acoustic pressure, an enhancement of ≈25 times is expected.

Further, two preferred alternative configurations of the acoustophoretic printing apparatus are depicted by FIG. 4.

Configuration A) of FIG. 4 shows that the nozzle 6 is introduced from a side (wall) of a chamber or open space between the emitter 1 and the reflector 2. The open space or chamber includes the first/main standing wave. The tubing 4 is bent so that the nozzle 6 can reach the conduit or reflectorless chamber 7, where a secondary acoustic standing wave or, at least, a second acoustic field 8 is present.

Configuration B) of FIG. 4 shows that the nozzle 6 or the tubing 4 enters from a hole 14 on a top of the emitter 1 and ends in the reflectorless chamber 7.

Furthermore, it is noted that different combinations are possible: emitter 1 and reflector 2 (as seen in FIG. 1), or emitter 1 and emitter 1 (see e.g. FIG. 6). The emitter 1 and reflector 2 can be placed either up or down as indicated in FIG. 4 by the use of the combined reference signs "1/2" at the positions of the emitter 1 and the reflector 2.

The fluids (first and second fluid) can be any fluid at any temperature that preferably does not spontaneously change their thermodynamic state (liquid and gas). Typically, the acoustophoretic printing system would work in air and would eject liquids. The air can be at high or low temperature. In principle, the same system can be designed to perform controlled ejection of liquids in immiscible liquids (the acoustic medium can be oil, for instance). The acoustic impedance of material may be carefully determined.

The geometry of reflector 2 and emitter 1 can be axisymmetric, two-dimensional (extrusion in the plane) or other geometries that allow for the formation of the standing wave. Typically, an emitter 1 with circular, squared, hexagonal or rectangular (cross-)section would be used and a reflector 2 with a characteristic dimension of its (cross-) section of the same order of magnitude.

The distance H (FIG. 4) between emitter 1 and reflector 2, more specifically between the relevant surfaces of the emitter 1 and the reflector 2 can be a multiple of $\lambda/2\pm0.2\lambda$, such as $0.5\lambda\pm0.2\lambda$, $1.0\lambda$, $\pm0.2\lambda$, $1.5\lambda\pm0.2\lambda$, etc. In such a way, an acoustic standing wave is imposed between the emitter 1 and reflector 2. Typically, a distance H≈$\lambda/2$ offers the strongest acoustic standing wave. The relevant surfaces of the emitter 1 and the reflector 2 in the configuration of FIG. 1 are the lower surface 1a of the emitter 1 and the upper surface 2a of the reflector 2.

The emitter(s) 1 oscillate(s) periodically with any wave form (typically a sinusoidal shape in ultrasonic range). The oscillation frequency can be in the range from 10 Hz to 100 MHz. The wavelength $\lambda$ is in the range 1 µm to several meters. Typically, frequencies above 16 kHz (close to the ultrasound range=not audible by human earing) and below 1 MHz offer the best compromise between acoustophoretic printing feature size, strength of acoustic forces, component manufacturing. The oscillation velocity amplitude can range from 1 µm/s to 100 m/s. The emitters 1 can include or be a piezoelectric transducer, a magnetostrictive transducer or other systems that can provide the needed wave excitation.

A characteristic dimension T of the reflectorless chamber/ conduit 7 (i.e. the diameter if it is a circular geometry, or the side length if it is square geometry, etc.) can be in the range of $0.01\lambda$ to $\lambda$. The reflectorless chamber 7 typically has a constant characteristic dimension T along an ejection line/ printing axis A: preferably, the reflectorless chamber 7 is a cylindrical section with a constant radius (as shown in FIG. 4). The reflectorless chamber 7 may also be conical, increasing the T-value while exiting the reflectorless chamber 7. In general, a larger T at the exit or bottom 9 of the reflectorless chamber 7 allows for a more stable droplet ejection. A height Hh (FIG. 4) of the reflectorless chamber 7 can be in the range from $0.01\lambda$ to $100\lambda$. Typically, a preferred height Hh range for reliable and stable ejection may be up to $10\lambda$.

A nozzle tip 6a or its opening 6b can have a diameter ranging from 0.01 µm to several centimeters. The tubing 4 connected to the nozzle 6 can have a diameter ranging from 0.1 µm to several centimeters. Typically, nozzle tips/openings 6a, 6b with diameters in the range of 1 µm to 250 µm offer the best compromise between the minimum acoustophoretic printed feature size and pressure drops within the nozzle 6.

The nozzle tip 6a can be positioned in any place within the reflectorless chamber 7, in particular, where a net force of the acoustic force 8a is present. However, if Hh is the height of the reflectorless chamber 7, one of the preferred regions to place the nozzle tip 6a for a reliable ejection is between the exit 9 of the reflectorless chamber 7 and Hh/3. The nozzle tip 6a can be of any material. Typically, it can be a tapered glass capillary, a Teflon capillary or a microfabricated tube. If a glass capillary is used, it is usually useful to carry out a hydrophobic treatment, depending on the ink that is printed. For water-based inks (e.g. most of the biological solutions), the wetting of the nozzle tips by the inks is reduced by using hydrophobic treatment. This also advantageously reduces the capillary force Fc.

To advance the ink through the nozzle 6, a drive means 5, such as a back pressure system would suffice. Typically, it can be a syringe-pump or pressure controlled (second fluid) reservoir.

Steps of the printing method for ejecting the second fluid from the nozzle (6) include the forming of the droplet 10 at the nozzle tip 6a. Preferably, the droplet 10 is formed by applying a pressure on the second fluid. An acoustic field 3, 8 with a force gradient, which points from the nozzle tip 6a to the printing substrate 11, is generated/activated by an oscillating emitter 1. The actual detaching of the droplet 10 may be actuated by activating the emitter oscillations or by modulating the oscillations to build up sufficient acoustic forces 3a, 8a. After the detachment, it is possible to deactivate the oscillations again or to modulate the oscillations such that the acoustic force 3a, 8a cannot detach a droplet 10 from the nozzle 6. Further, the detaching may also be caused by the droplet reaching a size at which the net force of the acoustic field 3, 8 overcomes the capillary forces, i.e. without modulating/activating the acoustic field 3, 8.

FIG. 5 shows a further preferred configuration of an acoustophoretic printing apparatus. Specifically, FIG. 5 shows a multiple nozzle configuration. By replicating a configuration, such as depicted in FIGS. 1 and 4, multiple droplets 10 (also of different inks) may be simultaneously and/or serially ejected. The reflectorless chambers/conduits 7 may be comprised in a single reflector-member or print head, as shown in FIG. 5, and, alternatively, a plurality of reflectors 2 may abut on each other so that the print head as shown in FIG. 5 is formed. The reflectorless chambers 7 and the printing axes A may be vertically arranged, as shown in FIG. 4. Alternatively, as FIG. 5 depicts, may be arranged with an angle of up to 90° with regard to the vertical axis. More specifically, FIG. 5 shows that the printing axes A of the plurality of reflectorless chambers 7 are varied such that the printed droplets 10 may be deposited on a single position on the substrate 11. The ejection angle allows for a fine printing resolution at the substrate/target surface.

In other words, FIG. 5 shows that the acoustophoretic printing apparatus is amenable to parallelization through a multiple nozzle system. This allows increasing the output capability. This renders feasible up-scaling and multiple-materials can be used in acoustophoretic 3D-printing. The print head features a nozzle array with independently controllable droplet size and the pitch between printed droplets.

FIG. 6 shows two emitters 1 (the use of more than two emitters is possible) that are used to focus the acoustic fields 3 at a focus point/predetermined point in space. This allows generating a net force which is large enough to detach and accelerate the pendant droplet 10. However, more preferably, the emitters 1 are arranged such as to form a standing wave without a reflector 2. To form a standing wave, in fact, at least two travelling waves travelling in a substantially opposite direction are needed, and, e.g., they should to have a predetermined phase difference to create a standing wave. Similarly, for instance, in the emitter-reflector configuration the reflector acts as an emitter with a specific phase. The reflected wave will have a phase depending on the physical distance from the emitter 1.

FIG. 7 shows using even more (multiple) emitters 1 to enhance the acoustic radiation pressure/acoustic force in a single focal point/predetermined point in space; a standing wave is not necessarily created. The emitters 1 are driven by (electric drive) signals with different phases and amplitudes. Alternatively, the emitters 1 can be used to produces one/multiple vortex beam(s) acting on the pendant droplet 10, generating a net force on it.

FIG. 8 shows a further configuration according to which an emitter 1 can be designed so that it can act as a (integrated) reflector 2. The emitter 1 has a cavity 15, into which the nozzle tip 6a with the pendant droplet 10 is inserted. The cavity is formed by the two side walls 16 of the emitter 1, which both oscillate from opposite directions, creating a standing wave.

FIG. 9 shows, as one example, the use of the acoustophoretic printing apparatus as a sample dispenser for biological solutions in the nl-µl range volume for standard 96, 384 and 1536 well plates 12. Configurations of the printing apparatus as shown in FIGS. 1, 4 and 5 may be used. The droplets 10 are ejected into in the wells/grooves 13 of the well plate 12, e.g., for further inspection/treatment.

Furthermore, the herein-described the acoustophoretic printing method/apparatus may be used in any field of printing. In particular, the advantage of the Z-number freedom offered by the acoustophoretic printing drastically broadens the material choice. Example fields of application are:

1) Application of the acoustophoretic printing to high-Z inks (from 1 to $10^4$). A sample dispenser of biological solutions in the nL-µL range volume for standard 96, 384 and 1536 well plates 12 (FIG. 6).

2) Application of the acoustophoretic printing to low-Z inks (from $10^{-4}$ to 1). The capability of ejecting DOD highly viscous fluid allows the use of conducting colloids with the purity of the inkjet inks but with the conductivity and metal concentration of contact printing technology. The application can be extended to the nontoxic, conductive, low melting point alloys as the eutectic gallium-indium, material of growing interest for soft electromechanical system.

3) 3D-printing using Newtonian fluids: 3D-structures by DOD acoustophoretic printing of fused deposition modeling (FDM) materials. This system would require a heated nozzle for melting commercially available FDM thermoplastics in filament form.

4) 3D-printing using non-Newtonian fluids: 3D-structures by DOD acoustophoretic printing of thixotropic fluids. Ceramic, polymeric and metallic inks, now printed only in filament forms due to their shear-thinning behavior, would be DOD dispensed, paving the way for new functional printing.

5) 3D-printing of tissue engineering: hydrogel bioinks are the key materials for engineering complex human tissues. Bioinks engineered for extrusion printing can be printed with the acoustophoretic DOD printing technology.

6) Microparticle production: compered to microfluidics, in which an immiscible oil phase is necessary for droplet (particle) creation, the acoustophoretic ejection employs surface forces in air. The use of a gas as external medium (first fluid) allows the production of complex microparticles. Additionally, by using a nozzle characterized by a coaxial flow, Janus and hollow microparticles can be acoustophoretically produced.

7) Biochemical analytical measurements: precise and rapid metering of chemicals and assays for rapid chemical, biochemical and biological reactors.

Summarizing, the described acoustophoretic printing allows a controlled ejection of predetermined volumes by use of acoustophoretic forces, at controlled frequency of droplet ejection. This can be used in diverse applications such as a biological dispenser, as a two dimensional or three-dimensional (3D) printer and for the production of microparticles. The printing process is not dependent from the material properties of the second fluid.

The invention claimed is:

1. A printing apparatus comprising:
   an emitter arranged within a first fluid and configured to oscillate for generating an acoustic field in the first fluid;
   a nozzle with a nozzle opening placed at a predetermined position within the acoustic field; and
   a second fluid within the nozzle, wherein the nozzle is connected to a tubing for a fluidic connection between a second fluid reservoir and the nozzle opening.

2. The printing apparatus of claim 1 comprising:
wherein the tubing has a diameter ranging from 0.1 μm to several centimeters.

3. The printing apparatus of claim 1, wherein the nozzle comprises a tapered glass capillary, a metallic tube, a Teflon capillary or a microfabricated tube.

4. The printing apparatus of claim 1, wherein the nozzle opening comprises a hydrophobic treatment to reduce wetting by the second fluid.

5. The printing apparatus of claim 1, wherein the nozzle opening is positioned in opposition to a printing substrate.

6. The printing apparatus of claim 1, wherein the tubing is bent, the nozzle being introduced from a side wall or side surface of the printing apparatus.

7. The printing apparatus of claim 1, wherein the emitter is attached to or includes a piezoelectric transducer or a magnetostrictive transducer.

8. A printing apparatus comprising:
an emitter arranged within a first fluid and configured to oscillate for generating an acoustic field in the first fluid;
a nozzle with a nozzle opening placed at a predetermined position within the acoustic field; and
a second fluid within the nozzle,
wherein the nozzle is introduced from a side wall or side surface of the printing apparatus.

9. The printing apparatus of claim 8, wherein the nozzle is connected to tubing for a fluidic connection between a second fluid reservoir and the nozzle opening.

10. The printing apparatus of claim 9, wherein the tubing is bent.

11. The printing apparatus of claim 8, wherein the nozzle comprises a tapered glass capillary, a metallic tube, a Teflon capillary or a microfabricated tube.

12. The printing apparatus of claim 8, wherein the nozzle opening comprises a hydrophobic treatment to reduce wetting by the second fluid.

13. The printing apparatus of claim 8, wherein the nozzle opening is positioned in opposition to a printing substrate.

14. The printing apparatus of claim 8, wherein the emitter is attached to or includes a piezoelectric transducer or a magnetostrictive transducer.

15. A method of acoustophoretic printing, the method comprising:
arranging a nozzle within a first fluid;
generating an acoustic field in the first fluid by an oscillating emitter; and
driving a second fluid out of the nozzle, thereby forming a pendant droplet of the second fluid at the nozzle opening, wherein acoustic forces from the acoustic field promote detachment of the pendant droplet from the nozzle opening,
wherein oscillation of the oscillating emitter is set constant or is modulated.

16. The method of claim 15, wherein the modulation of the oscillation comprises changing the oscillation frequency, phase and/or amplitude.

17. The method of claim 15, wherein the first fluid comprises air and the second fluid comprises a liquid selected from the group consisting of: water, an ink/dispersion, a pure liquid, a mixture, a colloid, and a liquid metal.

18. The method of claim 15, wherein the oscillating emitter has an oscillation frequency in a range from 1 Hz to 1 GHz.

19. The method of claim 15, wherein the nozzle has a nozzle opening positioned in opposition to a printing substrate, and
wherein, upon detachment of the pendant droplet from the nozzle opening, the second fluid is deposited onto the printing substrate as a printed droplet.

20. The method of claim 15, wherein the nozzle is introduced from a side wall or side surface of the printing apparatus.

* * * * *